Aug. 26, 1969  J. C. CLARK  3,462,930
POWER-OPERATED FRUIT HARVESTING HEAD
Filed May 23, 1967  3 Sheets-Sheet 1
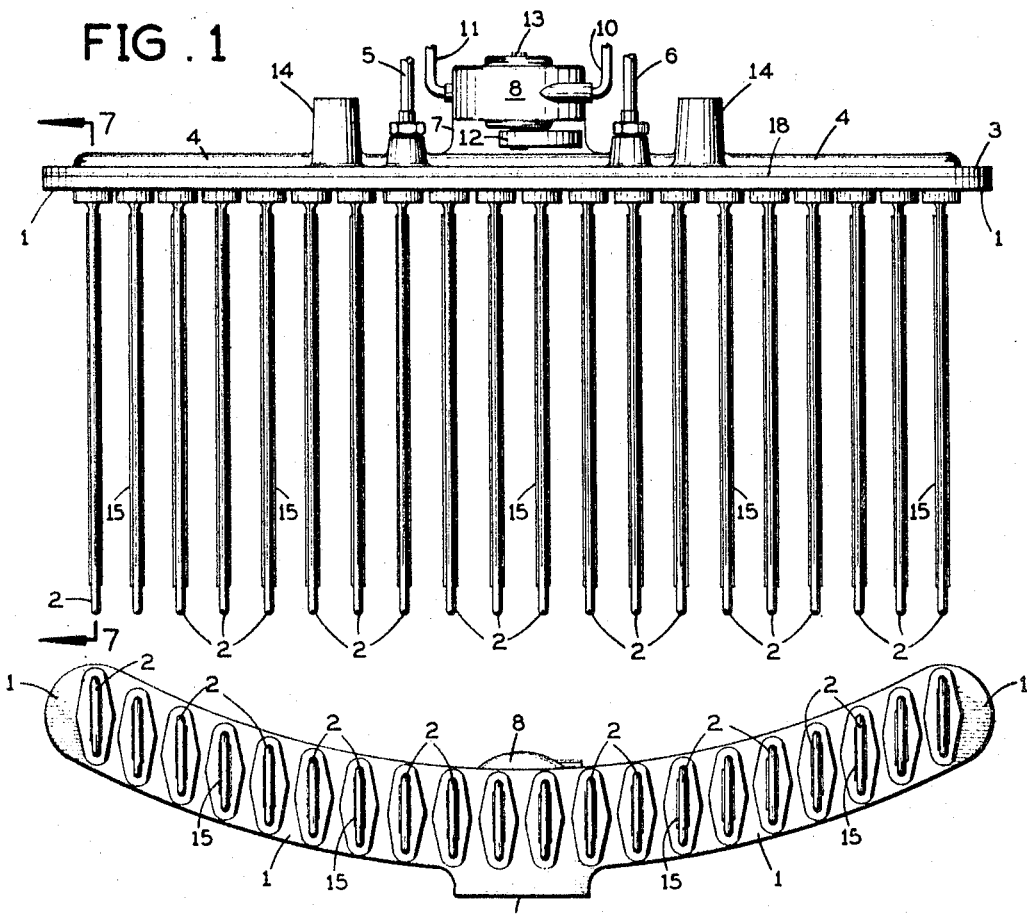
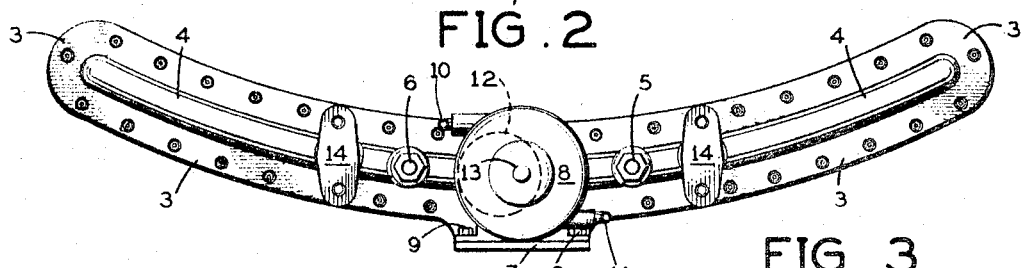
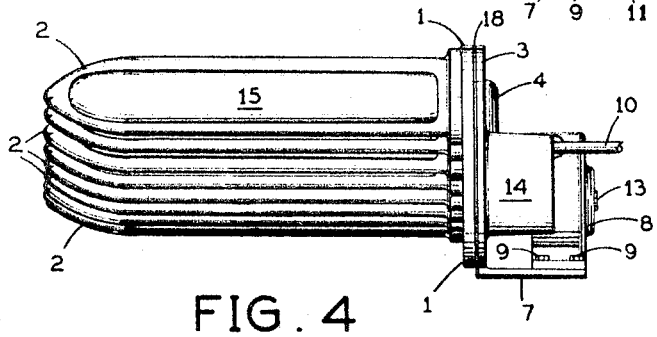
INVENTOR.
JOSEPH C. CLARK
BY
Lloyd J. Andres

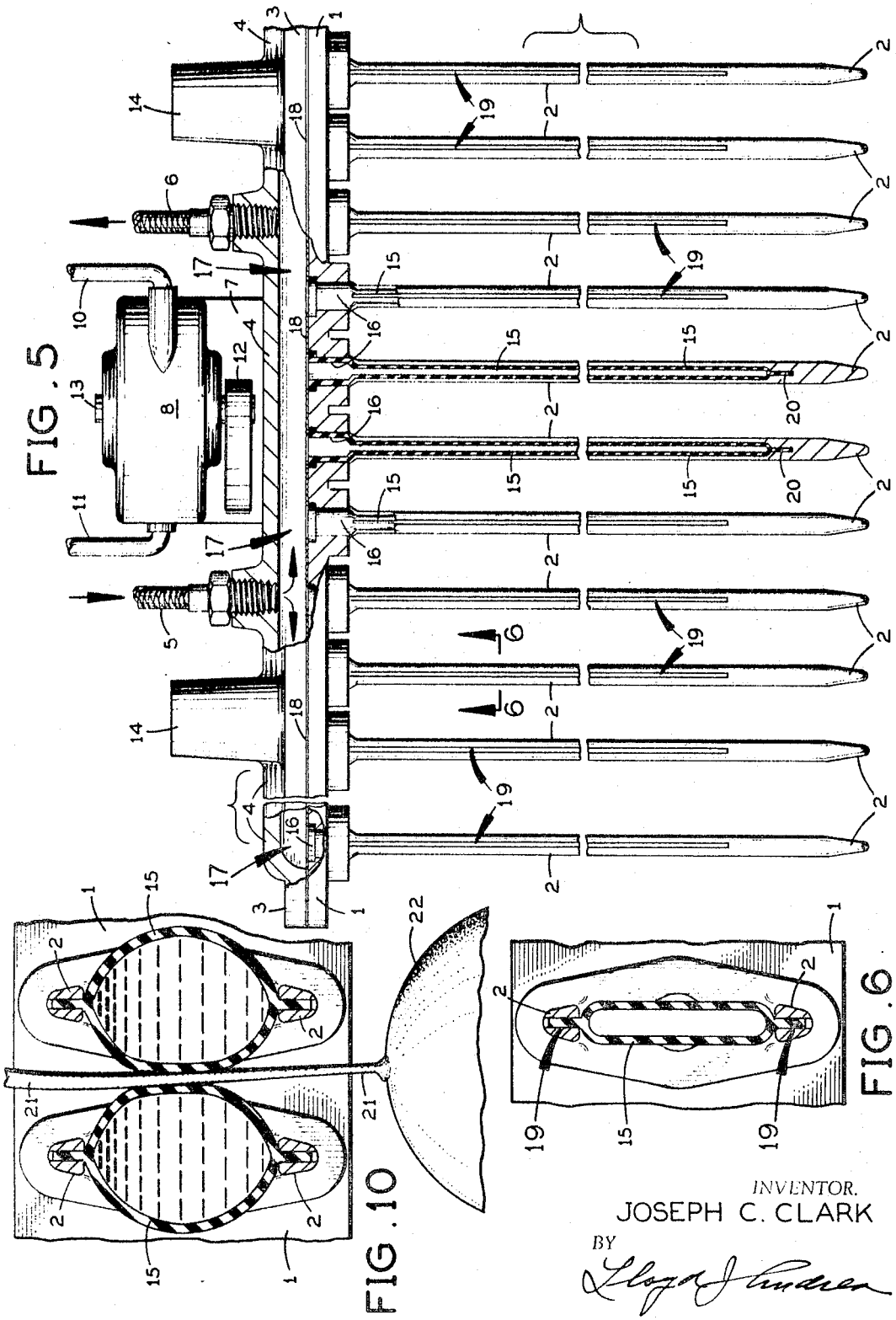

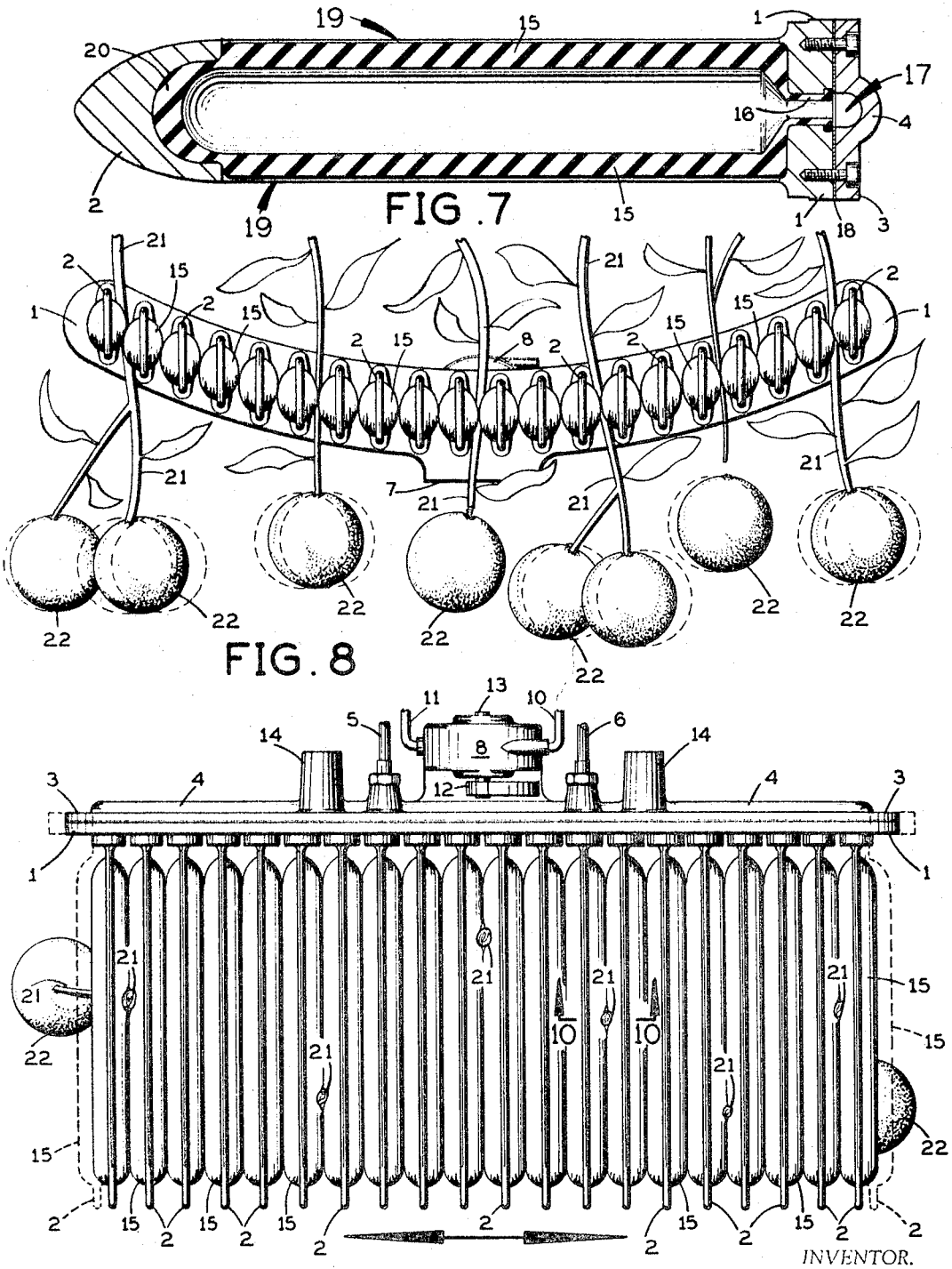

United States Patent Office 3,462,930
Patented Aug. 26, 1969

3,462,930
POWER-OPERATED FRUIT HARVESTING HEAD
Joseph C. Clark, 4843 Backacher Lane,
Orlando, Fla. 32806
Filed May 23, 1967, Ser. No. 640,623
Int. Cl. A01g 19/00
U.S. Cl. 56—328                                5 Claims

ABSTRACT OF THE DISCLOSURE

A fruit harvesting device for simultaneously gripping a plurality of fruit bearing branches of different diameter without injury thereto and vibrating the branches for releasing the fruit therefrom by remote power means connected thereto.

This invention relates in general to fruit harvesting devices and more particularly to a picking head particularly adapted to fruit of the citrus variety.

Reference is had to applicant's pending patent application, Ser. No. 484,051, entitled Fruit Picking Apparatus and now Patent No. 3,389,543

Prior devices for harvesting fruit from trees employ shaking means for shaking the main branches of the tree and permitting the fruit to gravitate into catching devices, which method has been found to seriously damage the tree and has largely been discarded.

Another prior picking means involves the shaking of the small branches or twigs holding the fruit by the lateral impact of fork members, which method also inflicts certain damage to the twigs and does not prevent "plugging" of the fruit since the forces breaking the junction of the stem with the fruit are not generally orbital.

These and other objections in prior apparatus for fruit picking are overcome by the provision of the present invention which involves a means for simultaneously grasping a plurality of twigs or branches bearing fruit in a firm but nondamaging manner and oscillating the stems or branches in a rapid small amplitude orbital manner, thus quickly breaking the bond between the stem and the fruit without "plugging," by virtue of the mass of the fruit, the construction of which is a principal object of the invention.

A further object of the invention is the provision of a fruit harvesting head in the form of a fork means for insertion into a tree with fruit bearing twigs or branches between the tines of said fork means including an expandable elastomer in facing relation between said tines for engaging and tightly holding said twigs or branches between said tines when said elastomers are subjected to internal hydraulic or pneumatic pressure.

Another object of the invention is the provision of a motor driven off-center weight means secured to and normally oscillating the aforesaid fork means when holding said twigs or branches in a lateral orbital oscillation when said motor is energized.

A further object of the invention is the provision of a fork having a plurality of tines for insertion into a plurality of twigs or branches bearing fruit including an expandable elastomer means on each of said tines for gripping said twigs or branches without damage thereto when said elastomer means are expanded including manifold means on said fork for conducting pressurized fluid into said elastomer means when connected to a source of pressurized fluid by flexible conduit means.

These and other objects and advantages in the invention are described and shown in the following specification and drawings, in which:

FIG. 1 is a top plan view of the fruit harvesting head.
FIG. 2 is a front elevation thereof.

FIG. 3 is a rear elevation thereof.
FIG. 4 is a right side elevation thereof.
FIG. 5 is an enlarged fragmentary bottom view of the head shown in FIG. 1 with portions thereof broken away.
FIG. 6 is an enlarged cross sectional view taken through section line 6—6, FIG. 5.
FIG. 7 is an enlarged cross sectional view taken through section line 7—7, FIG. 1.
FIG. 8 is the same as FIG. 2 in changed position, illustrating fruit bearing branches retained in lateral position therein.
FIG. 9 is the same as FIG. 1 illustrating the fruit bearing branches shown in FIG. 9 in fore and aft relation.
FIG. 10 illustrates the clamping of a single fruit bearing twig between two of the tines shown in FIG. 1.

Referring to FIGS. 1 and 4, inclusive, the harvesting fork assembly consists of a tine member 1 in arcuate shape, as shown, from which extends a plurality of fingers or tines 2 terminating at their outer ends in blunt pointed ends, better shown in FIGS. 6 and 7.

In this particular embodiment, the tines are integral with the member 1, however other well known forms of construction would permit the insertion and engagement of individual tines in member 1. A support member 3, shown in FIGS. 1, 3, and 4, is mated to the tine member 1 by screw means shown in FIG. 3 and has therein a channel forming an elongated manifold 4 connected to inlet and outlet conduits 5 and 6, respectively, by well known means for feeding hydraulic fluid or compressed air into and from the manifold, as will be hereinafter described. A projection 7 integral with member 3 serves as a support for a hydraulic or other type motor 8, which is secured by screws 9, as shown. The motor is supplied with inlet and outlet conduits 10 and 11, respectively, for connection to a source of hydraulic or pneumatic pressure. In the case of an electric motor, power thereto would be conducted by suitable conductors.

Referring to FIGS. 1 and 3, an off-center weight 12 is secured to the motor shaft 13, which is shown as a circular disc secured to shaft 13 a predetermined distance from its center of gravity.

A pair of bosses 14—14 are integral with member 3 for attachment to a manual handle for the manipulation thereof or for resilient attachment to a controlled mechanized traveling boom means.

Referring to FIGS. 5, 6, and 7, each of the tines 2 has a central elongated opening therein for retaining a closed end hollow elastic clamping tube 15. The tube 15 in each tine 2 terminates at its rearward end in a cylindrical flanged coupling 16, shown in FIG. 7, and is hermetically sealed in a shoulder bore in member 1, having an opening therethrough for connection to the elongated passageway 17 in manifold 4.

It is to be noted that a gasket 18 is positioned between members 1 and 3 to insure the hermetic sealing of passageway 17 and each coupling 16.

Each tube 15 is provided with a pair of parallel ribs along the opposite edges thereof for engagement in opposite grooves 19 on the inner sides of the opening in each of the tines 2, as illustrated in FIG. 6.

Each of the tubes 15 may be molded from one of several well known elastomers, such as neoprene, and assumes the cross sectional shape shown in FIGS. 6 and 7 when in inoperative position.

Referring to FIG. 7, it is to be noted that the forward end 20 of each tube 15 is engaged in arcuate groove in the pointed portion of each tine 2.

In operation and assuming that none of the elements shown in FIG. 1 are motivated, then the fork assembly is inserted into a tree in a horizontal position with the tines thereof coated at a small upward angle, which insertion will engage a group of fruit bearing twigs and branches between a group of the tines. When the fork assembly is in this position and hydraulic fluid under pressure is forced into conduit 5 and the outlet conduit 6 thereof checked a predetermined degree, then the tubes 15 will expand toward each other and securely clamp a twig therebetween without injury thereto, such as illustrated in FIG. 10, with a twig 21 retaining the piece of fruit 22.

FIGS. 8 and 9 more clearly illustrate the action of clamping a group of twigs and branches of different diameter on which fruit is secured. Under these circumstances, the motor 8 is momentarily energized, which will rotate the off-center weight 12 at a relatively high speed, which will impart rapid oscillation of relatively small amplitude to the entire fork assembly, which will simultaneously oscillate the branches held by the tubes 15 and dislodge the fruit from the stems by virtue of the static inertia of the mass in each piece of fruit. In the case of citrus fruit, this dislodgement will occur without "plugging" by virtue of the orbital oscillation of the stem, which will break its connection with the fruit without disturbing the skin. The fruit will then descend by gravity into one of several well known conveying devices, not shown. The motor 8 is then de-energized and the pressure to manifold 4 cut off, which will permit the tubes 15 to relax to the position shown in FIG. 6 and permit the free withdrawal of the fork assembly for re-insertion into an unpicked portion of the tree.

Having described my invention, I claim:

1. A fruit harvesting head comprising a means forming a frame,
   a plurality of tines of substantially equal length fixed to and extending from one side of said frame in equi-spaced parallel relation,
   each of said tines having an elongated lateral opening therein and terminating in a blunt pointed outer end,
   an elastic tube having a closed outer end secured in the said opening in each of said tines with said outer end thereof positioned within the outer end of said opening and termination at its inner end in an integral coupling means in said frame,
   a manifold means in said frame connected to each of said coupling means for conducting fluid into each said tube whereby the sides of said tubes will expand transversely toward each other and grip fruit bearing tree branches firmly therebetween without damage thereto when pressurizing fluid is connected to flow into said manifold, and,
   an actuator means secured to said frame including an oscillating member for oscillating said frame at a predetermined frequency within a predetermined amplitude when energized whereby said frame and said tines and said brances will oscillate at said frequency when said actuator means is energized for releasing said fruit from said branches.

2. A fruit harvesting head comprising a means forming an upturned arcuate frame including fastening means for mounting to a means for positioning into a fruit tree,
   a plurality of substantially vertical flattened tines of substantially equal length fixed to and extending from one side of said frame in equi-spaced arcuate relation in said upturned arcuate plane corresponding with said frame,
   each of said tines having an elongated opening therethrough and terminating in a blunt pointed outer end,
   an elastic tube having a closed outer end secured in the said opening in each of said tines with said outer end positioned in the outer end of said opening and terminating at its inner end in an integral coupling means in said frame,
   a manifold means secured to said frame and connected to each of said coupling means for conducting fluid into each said tube whereby the sides of said tubes will expand transversely toward each other and grip fruit bearing branches therebetween when pressurized fluid is connected by conduit means to flow into said manifold and each said tube,
   a motor means secured to said frame including a drive shaft extending therefrom with the axis of said shaft positioned substantially parallel to said tines, and
   a weight secured to said shaft with the center of gravity thereof positioned a predetermined distance from said axis whereby said frame and said tines and said branches will oscillate at a predetermined frequency when said motor means is energized for releasing said fruit from said branches.

3. In a fruit harvesting head of the character described a means forming a main frame having inner and outer sides,
   a plurality of tines of substantially equal length fixed to and extending from the inner side of said frame in equi-spaced parallel relation,
   an elongated cavity of uniform width centrally positioned through each of said tines,
   an elastic tube means having a closed outer end secured in said cavity in each of said tines with said outer end thereof positioned in the outer end of said cavity and terminating at its inner end in an integral coupling means sealed into said frame,
   a manifold member secured over the outer side of said frame with a channel therein opening into each of said coupling means of each of said tube means,
   a source of pressurized fluid,
   a conduit means connecting said source of fluid to said manifold member whereby fruit bearing branches positioned between said tines will be gripped between each pair of adjacent tube means by the expansion thereof when said pressurized fluid is permitted to fill said manifold member and each of said connections and each said tube means under predetermined pressure.

4. The construction recited in claim 3 including a vibrating means secured to said main frame for oscillating said harvesting head through a predetermined amplitude when energized.

5. The construction recited in claim 3 including a fluid motor secured to said main frame and having a rotatable output shaft with the axis of rotation thereof substantially parallel said tines,
   a mass of predetermined weight secured to said shaft with the center of gravity thereof displaced from said axis a predetermined distance whereby said harvesting head will oscillate at predetermined frequencies and amplitudes when said motor is energized at predetermined corresponding pressures.

References Cited

UNITED STATES PATENTS

| | | | |
|---|---|---|---|
| 2,544,443 | 3/1951 | Brateng | 56—330 |
| 3,023,565 | 3/1962 | McKibben et al. | 56—330 |
| 3,347,587 | 10/1967 | Frost | 56—328 X |
| 3,405,515 | 10/1968 | Dittmer | 56—328 |

LOUIS G. MANCENE, Primary Examiner

P. A. RAZZANO, Assistant Examiner